(12) United States Patent
Kurokami

(10) Patent No.: US 7,016,438 B2
(45) Date of Patent: Mar. 21, 2006

(54) CROSS POLARIZATION INTERFERENCE CANCELLER AND METHOD OF CANCELING CROSS POLARIZATION INTERFERENCE

(75) Inventor: Yuuzou Kurokami, Tokyo (JP)

(73) Assignee: NEC Corporation, Tokyo (JP)

( * ) Notice: Subject to any disclaimer, the term of this patent is extended or adjusted under 35 U.S.C. 154(b) by 519 days.

(21) Appl. No.: 09/988,374

(22) Filed: Nov. 19, 2001

(65) Prior Publication Data

US 2002/0061752 A1    May 23, 2002

(30) Foreign Application Priority Data

Nov. 17, 2000    (JP)    ............... 2000-350876

(51) Int. Cl.
| | |
|---|---|
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |

(52) U.S. Cl. ..................... 375/346; 375/322
(58) Field of Classification Search ............... 375/210, 375/144, 148, 346, 348; 455/268, 295, 101, 455/91
See application file for complete search history.

(56) References Cited

U.S. PATENT DOCUMENTS 6,236,263 B1 * 5/2001 Iwamatsu ................ 329/306

FOREIGN PATENT DOCUMENTS

| | | |
|---|---|---|
| EP | 0 307 950 A2 | 3/1989 |
| JP | 63-31981 | 6/1988 |
| JP | 63-222534 | 9/1988 |
| JP | 01291540 A | * 11/1989 |
| JP | 3-72732 | 3/1991 |
| JP | H05-211493 A | 8/1993 |
| JP | H06-061969 A | 3/1994 |
| JP | 2669235 | 7/1997 |
| JP | 2000-165339 | 6/2000 |
| JP | 2000-165339 A | 6/2000 |

* cited by examiner

Primary Examiner—Kevin Burd
Assistant Examiner—Juan Alberto Torres
(74) Attorney, Agent, or Firm—Sughrue Mion, PLLC

(57) ABSTRACT

A cross polarization interference canceller includes (a) first and second signal receivers which receive signals having been transmitted through first and second polarizations orthogonal with each other, (b) first and second local oscillators each of which converts one of the signals into an IF signal, (c) first and second demodulators each of which demodulates the IF signal for producing a base-band signal and a cross polarization interference cancel reference signal, (d) a phase-difference detector which detects a phase-difference between local signals transmitted from the first and second local oscillators, and transmits a phase-difference signal indicative of the thus detected phase-difference, and (e) first and second phase controllers associated with the first and second demodulators, respectively, and each equalizing phases of the base-band signal and the cross polarization interference cancel reference signal to each other in accordance with the phase-difference signal.

2 Claims, 6 Drawing Sheets

CROSS POLARIZATION INTERFERENCE CANCELLER AND METHOD OF CANCELING CROSS POLARIZATION INTERFERENCE

BACKGROUND OF THE INVENTION

1. Field of the Invention

The invention relates to cross polarization transmission in which signals are transmitted through two polarizations orthogonal to each other, and more particularly to a cross polarization interference canceller for canceling cross polarization interference in those two polarizations.

2. Description of the Related Art

A digital microwave communication equipment is generally designed to operate in two-polarizations transmission in which two polarizations, that is, vertical polarization and horizontal polarization having polarization planes orthogonal to each other, are used in order to enhance an efficiency at which frequencies are utilized. In the two-polarizations transmission, since vertical and horizontal polarizations use a common frequency, if the two polarization planes in an antenna or a space are not orthogonal to each other, signals leak into horizontal polarization from vertical polarization and vice versa.

Such signal leakage is called cross polarization interference, which exerts a harmful influence on transmission quality of signals. In particular, when the above-mentioned two-polarizations transmission and multi-value modulation and demodulation such as QAM are both used, they are significantly harmfully influenced by the cross polarization interference. Consequently, a cross polarization interference canceller (XPIC) is generally used for removing interference.

For instance, Japanese Unexamined Patent Publication No. 2000-165339 has suggested an example of a cross polarization interference canceller.

In a cross polarization interference canceller, polarization or polarized wave which is to be compensated for by canceling the cross polarization interference is defined as self-polarization or self-polarized wave, and a wave orthogonal to the self-polarized wave is defined as other-polarization or other-polarized wave. In order to cancel the cross polarization interference caused by the other-polarization, at a receiver, a relation in phase between a cross polarization interference cancel reference signal transmitted from the other-polarization and the self-polarization signal has to be identical with a relation in phase between the self- and other-polarizations at RF stage where the other-polarization interferes with the self-polarization.

In order to determine a local oscillation frequency of both the self- and other-polarizations to satisfy the above-mentioned requirement, either signal transmission local synchronization or signal receipt local synchronization may be selected.

The receipt local synchronization is often used when semi-synchronization is used for reproducing a carrier signal in a demodulator, because the semi-synchronization having a hardware structure is suitable to reproduction of a carrier signal. The receipt local synchronization is disclosed, for instance, in Japanese Unexamined Patent Publication No. 63-222534.

The receipt local synchronization is grouped into a common local system in which a receiver for the vertical polarization and a receiver for the horizontal polarization have a single local oscillator, and a common reference system in which each of a receiver for the vertical polarization and a receiver for the horizontal polarization has a local oscillator separately from each other, and commonly use a reference signal of the local oscillator.

The common local system has an advantage that a circuit structure thereof can be simplified, but is accompanied with a problem that signals associated with the vertical and horizontal polarizations are concurrently interrupted when a failure occurs in the local oscillator. Though the common reference system is complicated with respect to a circuit structure thereof, a failure in the local oscillator would exert a harmful influence only to one of the signals associated with the vertical and horizontal polarizations.

Thus, when a high efficiency at which radio-waves are utilized is required, and only one of the vertical and horizontal polarizations can be used as a backup line in radio-frequency, the reference synchronization is often selected for ensuring high redundancy.

FIG. 1 is a block diagram of a conventional demodulation system in accordance with the common reference synchronization which is one of the receipt local synchronization.

The illustrated demodulation system is comprised of first and second antennas 14 and 14a, first and second polarization receivers 15 and 15a, first and second local oscillators 16 and 16a, a common reference oscillator 17, and first and second demodulators 18 and 18a.

Each of the first and second demodulators 18 and 18a is comprised of a primary carrier oscillator 21, first and second multipliers 22 and 22a, first and second low pass filters 23 and 23a, first and second analog-digital converts 24 and 24a, a demodulator unit 35, an adder 28, a judgment circuit 29, and a cross polarization interference canceller 36.

In operation, data signals associated with vertical and horizontal polarizations are input into first and second modulators 11 and 11a through first and second terminals 1 and 1a, respectively. The modulated IF signals are frequency-converted into RF signals in first and second transmitters 12 and 12a, and then, radiated through first and second antennas 13 and 13a.

A first signal 100 having been transmitted through the first transmitter 12 associated with the vertical polarization, and an interference signal 101a having been transmitted through the second transmitter 12a associated with the horizontal polarization and having leaked into the vertical polarization are merged to each other, and are received in the first antenna 14 as a vertical polarization signal. The vertical polarization signal is frequency-converted into a vertical polarization IF signal 102 in the first receiver 15 which receives a local signal transmitted from the first local oscillator 16 which is in synchronization with the common reference oscillator 17.

Similarly to the above-mentioned case, a second signal 100a having been transmitted through the second transmitter 12a associated with the horizontal polarization, and an interference signal 101 having been transmitted through the first transmitter 12 associated with the vertical polarization and having leaked into the horizontal polarization are merged to each other, and are received in the second antenna 14a as a horizontal polarization signal. The horizontal polarization signal is frequency-converted into a horizontal polarization IF signal 102a in the second receiver 15a which receives a local signal transmitted from the second local oscillator 16a which is in synchronization with the common reference oscillator 17.

In demodulation of the vertical polarization, the first demodulator 18 demodulates the vertical polarization IF signal 102, cancels the cross polarization interference from the vertical polarization IF signal 102, using the horizontal polarization IF signal 102a as a cross polarization interference cancel reference signal, and outputs the thus demodulated data signal from which the interference was removed, through a first terminal 2.

Similarly, in demodulation of the horizontal polarization, the second demodulator 18a demodulates the horizontal polarization IF signal 102a, cancels the cross polarization interference from the horizontal polarization IF signal 102a, using the vertical polarization IF signal 102 as a cross polarization interference cancel reference signal, and outputs the thus demodulated data signal from which the interference was removed, through a second terminal 2a.

FIG. 2 is a block diagram of the first demodulator 18. Since the second demodulator 18a has the same structure as the structure of the first demodulator 18, only the structure of the first demodulator 18 is explained hereinbelow with reference to FIG. 2.

As illustrated in FIG. 2, the demodulator 35 is comprised of a numerical controlled oscillator (NCO) 25, a first endless phase shifter (EPS) 26, and a carrier synchronization controller 27, and the cross polarization interference canceller 36 is comprised of a second endless phase shifter (EPS) 26a, a transversal filter 30, and a tap coefficient control circuit 31.

An IF signal associated with the self-polarization and input through a first terminal 3 is frequency-converted in the first multiplier 22 by virtue of a primary carrier signal 111 transmitted from the primary carrier oscillator 21. Then, high frequency parts are removed from the IF signal in the first low-pass filter 23, and thereafter, converted into a digital signal by being quantized in the first analog-digital converter 24.

The digital signal and a secondary carrier signal 112 transmitted from the numerical controlled oscillator 25 are both input into the first endless phase shifter 26 for frequency conversion to thereby demodulate a base band signal.

The carrier synchronization controller 27 produces a phase control signal, based on an error signal transmitted from the judgment circuit 29, and controls a frequency of the secondary carrier signal 112 transmitted from the numerical controlled oscillator 25.

An IF signal associated with the other-polarization and input through a second terminal 4 is frequency-converted in the second multiplier 22a by virtue of the primary carrier signal 111 transmitted from the primary carrier oscillator 21. Then, high frequency parts are removed from the IF signal in the second low-pass filter 23a, and thereafter, converted into a digital signal by being quantized in the second analog-digital converter 24a.

The digital signal and the secondary carrier signal 112 are both input into the second endless phase shifter 26a for frequency conversion to thereby be changed to a cross polarization interference cancel (XPIC) reference signal.

The cross polarization interference cancel (XPIC) reference signal, and a tap coefficient produced in the tap coefficient control circuit 31 for cross polarization interference canceling are both input into the transversal filter 30, in which there is produced a copy signal which reflects interference caused by the other-polarization in a space. The copy signal is removed from the base band signal in the adder 28. Thus, cross polarization interference is removed.

As mentioned above, it is necessary to produce the copy signal which reflects the cross polarization interference caused in a space, by means of the cross polarization interference canceller, in order to cancel the cross polarization interference. To this end, a relation in phase between the self-polarization signal 100 and the other-polarization signal 101 at RF stage where cross polarization interference occurs has to be identical with a relation in phase between a self-polarization base band signal 103 at a base band stage where the interference is removed, and a base band cross polarization interference cancel reference signal 104.

In order to satisfy the above-mentioned requirement, the first and second demodulators 18 and 18a commonly use the primary carrier signal 111, the secondary carrier signal 112, and the reference signal transmitted to the first and second local oscillators 16 and 16a for frequency synchronization in the conventional demodulation system illustrated in FIG. 1. The relation in phase between the first and second demodulators 18 and 18a is compensated for the first and second cross polarization interference cancellers 36 and 36a.

The cross polarization interference canceling operation in the conventional receipt local synchronization is explained hereinbelow through equations.

Signals are defined as follows.

(A) A base band signal V(t) of the vertical polarization is defined as follows.

$$V(t)=V_P(t)+jV_Q(t)$$

$V_P(t)$ indicates P-channel parts, and $V_Q(t)$ indicates Q-channel parts.

(B) A base band signal H(t) of the horizontal polarization is defined as follows.

$$H(t)=H_P(t)+jH_Q(t)$$

$H_P(t)$ indicates P-channel parts, and $H_Q(t)$ indicates Q-channel parts.

(C) A carrier signal of the vertical polarization is defined as $\cos(\omega_{VT} \times t + \theta_{VT})$ wherein "$\omega_{VT}$" indicates a frequency of a carrier signal of the vertical polarization and "$\theta_{VT}$" indicates a phase of a carrier signal of the vertical polarization.

(D) A carrier signal of the horizontal polarization is defined as $\cos(\omega_{HT} \times t + \theta_{HT})$ wherein "$\omega_{HT}$" indicates a frequency of a carrier signal of the horizontal polarization and "$\theta_{HT}$" indicates a phase of a carrier signal of the horizontal polarization.

Under these definitions, RF signals of the vertical and horizontal polarizations $V_{TX}(t)$ and $H_{TX}(t)$ can be expressed as follows.

$$V_{TX}(t)=V_P(t) \times \cos(\omega_{VT} \times t + \theta_{VT}) - V_Q(t) \times \sin(\omega_{VT} \times t + \theta_{VT})$$
$$=\text{real}[V(t) \times \exp(j(\omega_{VT} \times t + \theta_{VT}))]$$

$$H_{TX}(t)=\text{real}[H(t) \times \exp(j(\omega_{HT} \times t + \theta_{HT}))]$$

If it is assumed that the RF signal of the horizontal polarization is merged with the RF signal of the vertical polarization through a coefficient αV, and the RF signal of the vertical polarization is merged with the RF signal of the horizontal polarization through a coefficient αH, the RF signals $V_{RX}(t)$ and $H_{RX}(t)$ of the vertical and horizontal polarizations can be expressed as follows.

$$V_{RX}(t)=\text{real}[V(t) \times \exp(j(\omega_{VT} \times t + \theta_{VT}))] + \alpha V \times H(t) \times \exp(j(\omega_{HT} \times t + \theta_{HT}))]$$

$$H_{RX}(t)=\text{real}[H(t) \times \exp(j(\omega_{HT} \times t + \theta_{HT}))] + \alpha H \times V(t) \times \exp(j(\omega_{VT} \times t + \theta_{VT}))]$$

Each of the above-mentioned RF signals is frequency-converted in the first and second receivers 15 and 15a in accordance with the following local signals (a) and (b):

(a) Local signal of the vertical polarization: $\cos(\omega_R \times t + \theta_{VR})$ wherein "$\omega_R$" indicates a frequency of the received local signal, and "$\theta_{VR}$" indicates a phase of the received local signal of the vertical polarization; and (b) Local signal of the horizontal polarization: $\cos(\omega_R \times t + \theta_{HR})$ wherein "$\theta_{HR}$" indicates a phase of the received local signal of the horizontal polarization.

Since the local signals are both synchronized commonly with the reference signal, the local signals have the same frequency as each other, and a phase independent of each other.

Herein, it is assumed that the vertical polarization defines self-polarization, which is developed hereinbelow. A received IF signal $V_{IF}(t)$ having passed through a receiver of the self-polarization and a cross polarization interference cancel reference signal $V_{IX}(t)$ having passed a receiver of the other-polarized can be expressed as follows.

$$V_{IF}(t) = \text{real}[V(t) \times \exp(j((\omega_{VT}-\omega_R) \times t+(\theta_{VT}-\theta_{VR})))] + \alpha V \times H(t) \times \exp(j((\omega_{HT}-\omega_R) \times t+(\theta_{HT}-\theta_{VR})))]$$

$$V_{IX}(t) = \text{real}[H(t) \times \exp(j((\omega_{HT}-\omega_R) \times t+(\theta_{HT}-\theta_{HR})))] + \alpha H \times V(t) \times \exp(j((\omega_{VT}-\omega_R) \times t+(\theta_{VT}-\theta_{HR})))]$$

Since the first demodulator 18 matches an oscillation frequency of its internal oscillator to a frequency and a phase of the received IF signal, a frequency of the received IF signal is equal to an oscillation frequency of the first demodulator 18, as follows.

$$(\omega_{VT}-\omega_R) = (\omega_{D1}+\omega_{D2})$$

$$(\theta_{VT}-\theta_{VR}) = (\theta_{D1}+\theta_{D2})$$

In these equations, "$\omega_{D1}$" indicates a frequency of the received primary carrier signal, "$\omega_{D2}$" indicates a frequency of the received secondary carrier signal, "$\theta_{D1}$" indicates a phase of the received primary carrier signal, and "$\theta_{D2}$" indicates a phase of the received secondary carrier signal.

A received base band signal $V_{BB}(t)$ resulting from demodulation of the received IF signal is expressed as follows.

$$V_{BB}(t) = \text{real}[V(t) \times \exp(j((\omega_{VT}-\omega_R-\omega_{D1}-\omega_{D2}) \times t+(\theta_{VT}-\theta_{VR}-\theta_{D1}-\theta_{D2}))) + \alpha V \times H(t) \times \exp(j((\omega_{HT}-\omega_R-\omega_{D1}-\omega_{D2}) \times t+(\theta_{HT}-\theta_{VR}-\theta_{D1}-\theta_{D2})))]$$

$$= V(t)+\text{real}[\alpha V \times H(t) \times \exp(j((\omega_{HT}-\omega_{VT}) \times t+(\theta_{HT}-\theta_{VT})))]$$

A base band cross polarization interference cancel (XPIC) reference signal $V_{BX}(t)$ which is to be input into the transversal filter 30 is expressed as follows.

$$V_{BX}(t) = \text{real}[H(t) \times \exp(j((\omega_{HT}-\omega_R-\omega_{D1}-\omega_{D2}) \times t+(\theta_{HT}-\theta_{HR}-\theta_{D1}-\theta_{D2}))) + \alpha H \times V(t) \times \exp(j((\omega_{VT}-\omega_R-\omega_{D1}-\omega_{D2}) \times t+(\theta_{VT}-\theta_{HR}-\theta_{D1}-\theta_{D2})))]$$

$$= \text{real}[H(t) \times \exp(j((\omega_{HT}-\omega_{VT}) \times t+(\theta_{HT}-\theta_{HR}-\theta_{VT}+\theta_{VR}))) + \alpha H \times V(t) \times \exp(j(\theta_{VR}-\theta_{HR}))]$$

Since the cross polarization interference canceller 36 produces a copy signal reflecting the cross polarization interference existing in the received base band signal, based on the cross polarization interference cancel reference signal, the copy signal $V_{XPIC}(t)$ produced by the cross polarization interference canceller 36 and a response signal made by the cross polarization interference canceller 36 are expressed as follows, if the cross polarization interference canceller 36 ideally operates.

$$V_{XPIC}(t) = \text{real}[-\alpha V \times H(t) \times \exp(j((\omega_{HT}-\omega_{VT}) \times t+(\theta_{HT}-\theta_{VT})))] - \alpha V \times \alpha H \times V(t)$$

The response signal $= -\alpha V \times \exp(j(\theta_{HR}-\theta_{VR}))$.

The received base band signal and the cross polarization interference cancel reference signal are added to each other in the adder 28, resulting in that the cross polarization interference is removed from the base band signal $V_O(t)$, which is expressed as follows.

$$V_O(t) = V(t) - \alpha V \times \alpha H \times V(t)$$

The second component "$\alpha V \times \alpha H \times V(t)$" in the base band signal $V_O(t)$ constitutes an interference part between signs. However, since $\alpha V$ and $\alpha H$ are generally much smaller than 1, the second component can be disregarded. If $\alpha V$ and $\alpha H$ cannot be disregarded, the interference part could be removed by additionally using an equalizer.

A local oscillator generally used at RF stage includes much phase noises, and hence, time fluctuation is generated in a phase-relating component, if a frequency-relating component is kept fixed. In the receipt reference synchronization, since the vertical and horizontal polarizations use local oscillators separately from each other, oscillation frequencies of the local oscillators can be made equal to each other by means of a common reference oscillator. However, since phase noises are generated in the local oscillators independently of each other, time fluctuation remains also in local phase difference terms of the vertical and horizontal polarizations.

In order for the cross polarization interference canceller 36 to properly operate under the above-mentioned circumstances, the cross polarization interference canceller 36 is required not only to make a copy of the cross polarization interference part $\alpha V$, but also to follow a local phase difference $\exp(j(\theta_{HR}-\theta_{VR}))$ which varies with the lapse of time.

However, since the cross polarization interference canceller 36 includes the transversal filter 30, the cross polarization interference canceller 36 can make the copy signal reflecting a phase difference which does not vary with the lapse of time, but cannot follow a phase difference rapidly varying with the lapse of time, and hence, cannot make the copy signal reflecting such a phase difference. This is because the transversal filter 30 cannot follow the dynamic characteristics required in the tap coefficient control circuit 27.

In addition, since the ability to follow a phase difference is degraded as a tap coefficient of the transversal filter 30 becomes great, the ability is degraded as the cross polarization interference becomes great.

As having been explained, the conventional cross polarization interference canceller of the receipt reference synchronization type is accompanied with a problem that the ability of canceling the cross polarization interference is unavoidably degraded, if a phase noise component is increased in the local oscillator.

Japanese Unexamined Patent Publication No. 63-31981 has suggested a circuit for canceling cross polarization, including a first synchronization detector to which an input signal associated with first polarization is input, a second synchronization detector to which an input signal associated with second polarization orthogonal to the first polarization is input, and a reproducer which reproduces interference part. The reproducer is comprised of first means for detecting beats of reference carrier waves of the first and second synchronization detectors, second means for multiplying an output transmitted from the first means, by an output transmitted from the second synchronization detector to thereby produce a first pseudo-interference signal, and third means for multiplying a complex conjugate signal in an output signal transmitted from the first means, by an output signal transmitted from the first synchronization detector to thereby produce a second pseudo-interference signal. The first pseudo-interference signal is used for removing a polarization interference signal included in the output signal transmitted from the first synchronization detector, and the second pseudo-interference signal is used for removing a polarization interference signal included in the output signal transmitted from the second synchronization detector.

Japanese Unexamined Patent Publication No. 3-72732 has suggested a cross polarization interference canceller including first means for receiving horizontal and vertical polarization signals transmitted through polarizations orthogonal to each other, second means for detecting a relation between an error signal indicative of interference which is caused by the vertical polarization signal and which leaked into the horizontal polarization signal, and an identification signal obtained from the vertical polarization signal, and transmitting a first interference cancel signal, third means for removing the interference from the horizontal polarization signal in accordance with the first interference cancel signal, fourth means for detecting a relation between an error signal indicative of interference which is caused by the horizontal polarization signal and which leaked into the vertical polarization signal, and an identification signal obtained from the horizontal polarization signal, and transmitting a second interference cancel signal, fifth means for removing the interference from the vertical polarization signal in accordance with the second interference cancel signal, and sixth means for sampling both one of the polarization signals for obtaining the error signal and the other of the polarization signals for obtaining the identification signal through a common clock signal, and supplying the thus sampled signals to the second and fourth means.

Japanese Patent No. 2669235 (Japanese Unexamined Patent Publication No. 5-211493) has suggested a cross polarization interference canceller which, on receiving primary and secondary polarization signals transmitted through polarizations orthogonal to each other in synchronization with clock signals, removes a secondary polarization signal part having cross-interfered with the primary polarization signal. The cross polarization interference canceller includes first means for transmitting a first reproduction clock signal, based on a first base band signal obtained by demodulating the primary polarization signal, in synchronization with a clock signal of the primary polarization signal, second means for transmitting a second reproduction clock signal, based on a second base band signal obtained by demodulating the secondary polarization signal, in synchronization with a clock signal of the secondary polarization signal, third means for transmitting a third reproduction clock signal, based on the first base band signal, in synchronization with a clock signal of the above-mentioned secondary polarization signal part, fourth means for detecting a phase difference between the second and third reproduction clock signals, and controlling a phase of the first reproduction clock signal in accordance with the phase difference to thereby transmit a fourth reproduction clock signal, fifth means for sampling the first base band signal by virtue of the first reproduction clock signal to thereby produce a first digital signal, sixth means for sampling the second base band signal by virtue of the fourth reproduction clock signal to thereby produce a second digital signal, a transversal filter which transmits a cancel signal having the same frequency and amplitude as those of the secondary polarization signal part, based on the second digital signal, seventh means for delaying the first digital signal by a period of time required for the transversal filter to produce the cancel signal, and eighth means for subtracting the delayed first digital signal from the cancel signal to remove the secondary polarization signal part.

However, the above-mentioned problem remains unsolved even in these Publications.

SUMMARY OF THE INVENTION

In view of the above-mentioned problem in the conventional cross polarization interference canceller, it is an object of the present invention to provide a cross polarization interference canceller which can prevent degradation of the ability of canceling the cross polarization interference, caused by an increase in phase noises in a local oscillator.

In order to cancel the cross polarization interference in a cross polarization interference canceller (XPIC), a relation in phase between a self-polarization signal and an other-polarization signal at RF stage where the interference occurs has to be identical with a relation in phase between a self-polarization base band signal and a base band cross polarization interference cancel reference signal at a base band stage where the interference is to be removed.

Consequently, the cross polarization interference canceller in accordance with the present invention is designed to include a local phase difference detector which detects a relation in phase between first and second local oscillators associated with two polarizations orthogonal to each other, and an endless phase shifter (EPS) which compensates for a phase difference detected by the local phase difference detector. The cross polarization interference canceller controls a phase of the cross polarization interference cancel reference signal and cancels phase noises included in the cross polarization interference cancel reference signal such that the above-mentioned relations are identical with each other.

Specifically, in one aspect of the present invention, there is provided a cross polarization interference canceller includes (a) first and second signal receivers which receive signals having been transmitted through first and second polarizations orthogonal with each other, (b) first and second local oscillators each of which converts one of the signals into an IF signal, (c) first and second demodulators each of which demodulates the IF signal for producing a base-band signal and a cross polarization interference cancel reference signal, (d) a phase-difference detector which detects a phase-difference between local signals transmitted from the first and second local oscillators, and transmits a phase-difference signal indicative of the thus detected phase-difference, and (e) first and second phase controllers associated with the first and second demodulators, respectively, and each equalizing phases of the base-band signal and the cross polarization interference cancel reference signal to each other in accordance with the phase-difference signal.

There is further provided a cross polarization interference canceller including (a) first and second signal receivers which receive signals having been transmitted through first and second polarizations orthogonal with each other, (b) first and second local oscillators each of which converts one of the signals into an IF signal, (c) first and second demodulators each of which demodulates the IF signal for producing a base-band signal and a cross polarization interference cancel reference signal, (d) a phase-difference detector which detects a phase-difference between local signals transmitted from the first and second local oscillators, and transmits a phase-difference signal indicative of the thus detected phase-difference, (e) first and second phase controllers associated with the first and second demodulators, respectively, and each equalizing phases of the base-band signal and the cross polarization interference cancel reference signal to each other in accordance with the phase-difference signal, and (f) a reference oscillator electrically connected to both the first and second local oscillators for synchronizing the first and second local oscillators with each other.

It is preferable that the phase-difference detector transmits two phase-difference signals in which directions in which phases are deviated are opposite to each other, and wherein the first and second phase controllers receive the two phase-difference signals transmitted from the phase-difference detector, and transmit signals to the first and second demodulators, respectively, in which signals phase-shifting directions are opposite to each other.

For instance, each of the first and second phase controllers may be comprised of a variable phase-shifter.

For instance, each of the first and second demodulators may be comprised of (c1) a carrier oscillator which converts frequencies of both IF signals transmitted through the first and second polarizations, (c2) first and second analog-digital converters which convert the IF signals into first and second digital signals for the first and second polarizations, respectively, (c3) a numerical controlled oscillator which transmits a carrier signal, (c4) a first endless phase-shifter which receives both the first digital signal and the carrier signal, and demodulates the base band signal, (c5) a second endless phase-shifter which receives both the second digital signal and the carrier signal, and demodulates the cross polarization interference cancel reference signal, (c6) a filter which receives the cross polarization interference cancel reference signal, and produces a first signal indicative of interference caused by the second polarization, (c7) an adder which adds the base band signal and the first signal to each other to thereby remove cross polarization interference, (c8) a judgment circuit which receives an output signal transmitted from the adder, and transmits an error signal, (c9) a carrier synchronization controller which controls a frequency of the carrier signal in accordance with the error signal, and (c10) a tap coefficient controller which controls a tap coefficient of the filter in accordance with the error signal.

For instance, each of the first and second phase controllers may be comprised of a variable phase-shifter electrically connected to the second endless phase-shifter upstream thereof.

The phase-difference detector may be designed to include (d1) a multiplier which multiplies signals transmitted from the first and second local oscillators, by each other to thereby transmit a frequency-difference signal, (d2) an analog-digital converter which converts the frequency-difference signal to a digital signal, (d3) a numerical controlled oscillator which transmits a local phase-difference signal, (d4) a phase comparator compares the local phase-difference signal and the frequency-difference signal to each other, and transmits a difference signal indicative of a difference between the local phase-difference signal and the frequency-difference signal, and (d5) a filter which controls a frequency of the local phase-difference signal in accordance with the difference signal.

In another aspect of the present invention, there is provided a method of canceling cross polarization interference, including the steps of (a) receiving signals having been transmitted through first and second polarizations orthogonal with each other, (b) converting the signals having been received in the step (a) into IF signals, (c) demodulating the IF signals for producing a base-band signal and a cross polarization interference cancel reference signal, (d) detecting a phase-difference between the IF signals and transmitting a phase-difference signal indicative of the thus detected phase-difference, and (e) equalizing phases of the base-band signal and the cross polarization interference cancel reference signal to each other in accordance with the phase-difference signal.

The method may further include the step of synchronizing the signals with each other.

For instance, the step (c) may be designed to include the steps of (c1) converting frequencies of both IF signals transmitted through the first and second polarizations, (c2) converting the IF signals into first and second digital signals for the first and second polarizations, respectively, (c3) demodulating the base band signal, based on the first digital signal and the carrier signal, (c4) demodulating the cross polarization interference cancel reference signal, based on both the second digital signal and the carrier signal, (c5) producing a first signal indicative of interference caused by the second polarization, and (c6) adding the base band signal and the first signal to each other to thereby remove cross polarization interference.

For instance, the step (d) may be designed to include the steps of (d1) multiplying signals transmitted from local oscillators, by each other to thereby transmit a frequency-difference signal, (d2) converting the frequency-difference signal to a digital signal, (d3) comparing the local phase-difference signal and the frequency-difference signal to each other, and transmitting a difference signal indicative of a difference between the local phase-difference signal and the frequency-difference signal, and (d4) controlling a frequency of the local phase-difference signal in accordance with the difference signal.

The advantages obtained by the aforementioned present invention will be described hereinbelow.

In accordance with the present invention, it is possible to prevent degradation of cross polarization interference canceling performance in the conventional reference synchronization type cross polarization interference canceller which degradation is caused by local phase noises of self- and other-polarizations.

In addition, the cross polarization interference canceller can be simplified in structure by operating the reference oscillator in the vertical and horizontal polarizations independently of each other.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
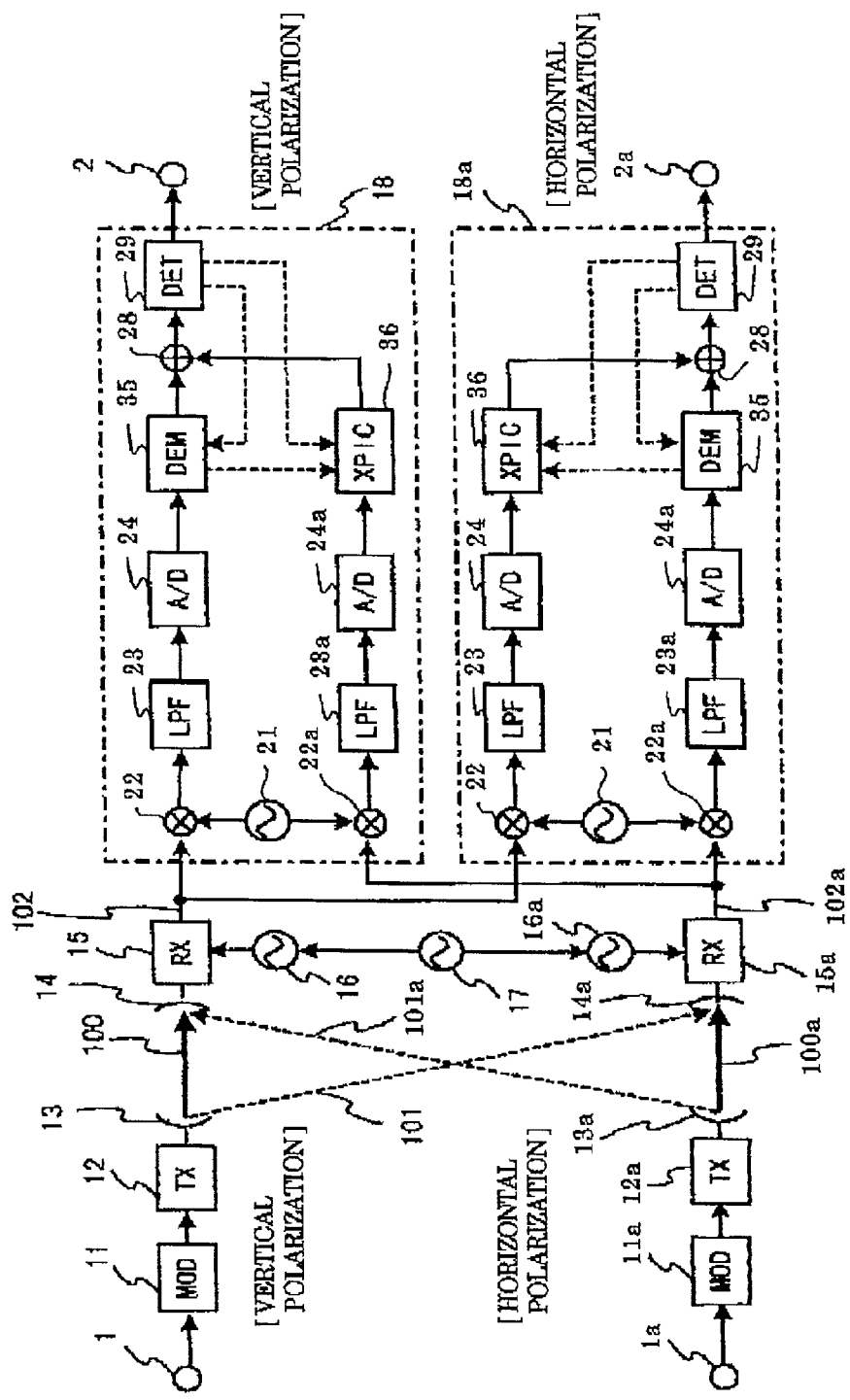
FIG. 1 is a block diagram of a conventional demodulation system in accordance with the common reference synchronization which is one of the receipt local synchronization.
Figure 2:
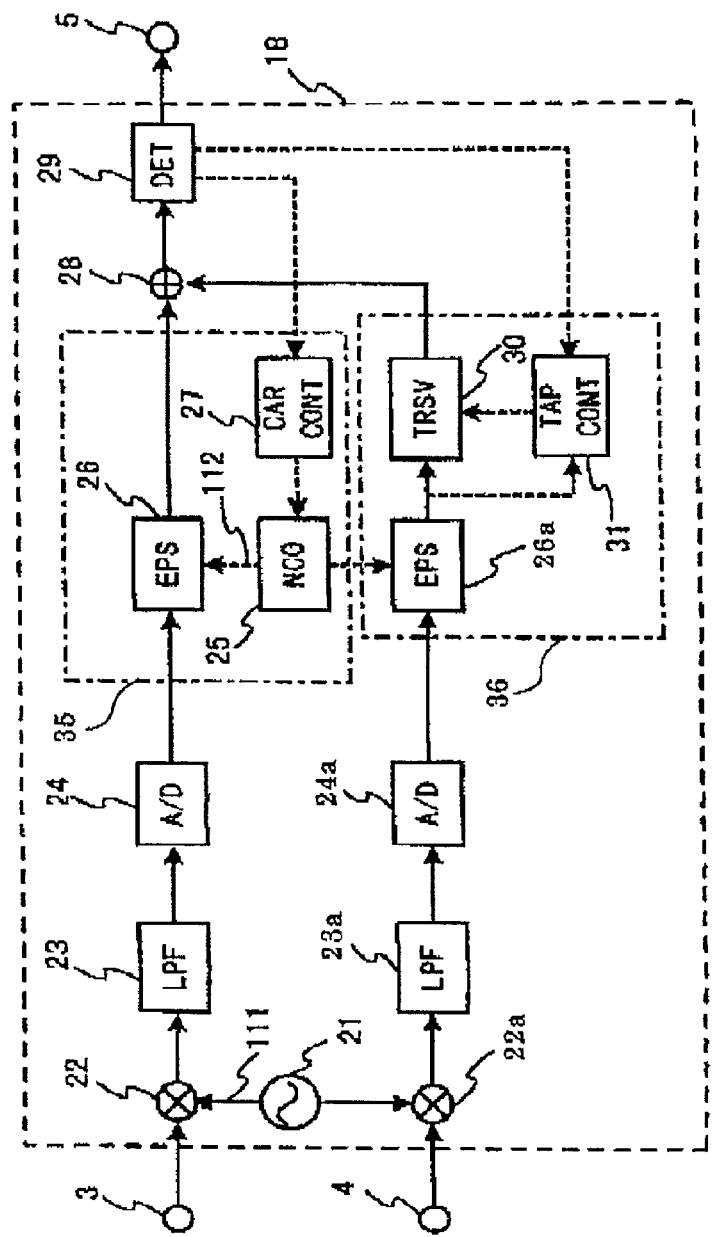
FIG. 2 is a block diagram of the demodulator which is a part of the demodulation system illustrated in FIG. 1.
Figure 3:
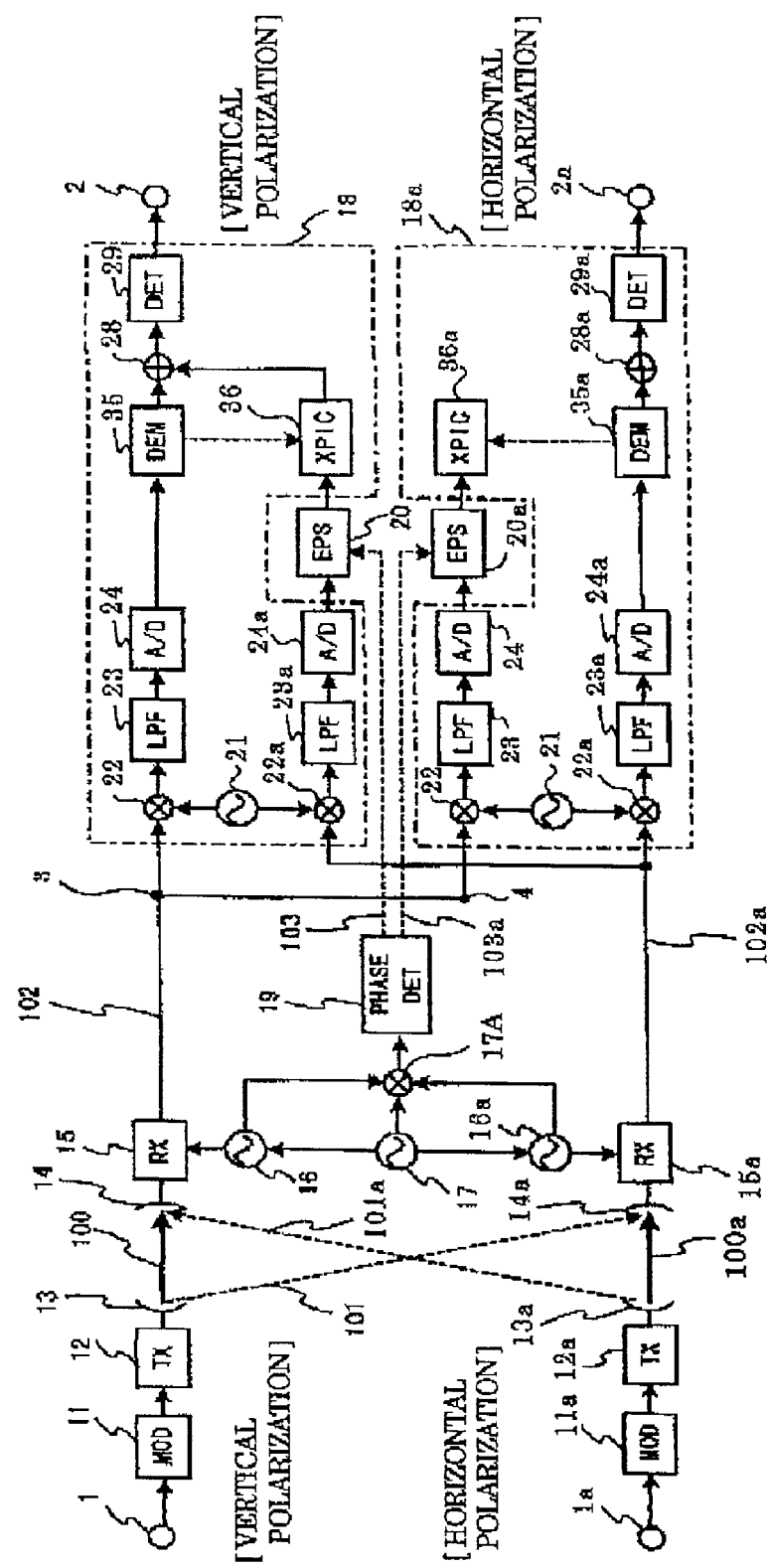
FIG. 3 is a block diagram of the demodulation system in accordance with the first embodiment of the present invention.

FIG. 3 is a block diagram of the demodulation system in accordance with the first embodiment.

With reference to FIG. 3, the demodulation system is comprised of first and second antennas 14 and 14a, first and second polarization receivers 15 and 15a, first and second local oscillators 16 and 16a, a common reference oscillator 17, a multiplier 17A, a local phase difference detector 19, first and second demodulators 18 and 18a, and first and second endless phase shifters 20 and 20a.

Each of the first and second demodulators 18 and 18a is comprised of a primary carrier oscillator 21, first and second multipliers 22 and 22a, first and second low pass filters 23 and 23a, first and second analog-digital converts 24 and 24a, a demodulator unit 35, an adder 28, a judgment circuit 29, and a cross polarization interference canceller 36.

In operation, data signals associated with vertical and horizontal polarizations are input into first and second modulators 11 and 11a through first and second terminals 1 and 1a, respectively. The modulated IF signals are frequency-converted into RF signals in first and second transmitters 12 and 12a, and then, radiated through first and second antennas 13 and 13a.

A first signal 100 having been transmitted through the first transmitter 12 associated with the vertical polarization, and an interference signal 101a having been transmitted through the second transmitter 12a associated with the horizontal polarization and having leaked into the vertical polarization are merged to each other in a space, and are received in the first antenna 14 as a vertical polarization signal. The vertical polarization signal is frequency-converted into a vertical polarization IF signal 102 in the first receiver 15 which receives a local signal transmitted from the first local oscillator 16 which is in synchronization with the common reference oscillator 17.

Similarly to the above-mentioned case, a second signal 100a having been transmitted through the second transmitter 12a associated with the horizontal polarization, and an interference signal 101 having been transmitted through the first transmitter 12 associated with the vertical polarization and having leaked into the horizontal polarization are merged to each other in a space, and are received in the second antenna 14a as a horizontal polarization signal. The horizontal polarization signal is frequency-converted into a horizontal polarization IF signal 102a in the second receiver 15a which receives a local signal transmitted from the second local oscillator 16a which is in synchronization with the common reference oscillator 17.

The local phase difference detector 19 receives local signals from the first and second local oscillators 16 and 16a, detects a phase difference between the local signals by means of a phase locked loop (PLL) circuit equipped therein, and transmits control signals 103 and 103a to the first and second endless phase shifters 20 and 20a.

In demodulation of the vertical polarization, the first demodulator 18 demodulates the vertical polarization IF signal 102. The horizontal polarization IF signal 102a is input into the first endless phase shifter 20 after having been frequency-converted in the second multiplier 22a of the first demodulator 18, and then, a phase of the horizontal polarization IF signal 102a is rotated so as to cancel the phase difference having been detected in the local phase difference detector 19. The cross polarization interference is canceled, using an output signal transmitted from the first endless phase shifter 20, as a cross polarization interference cancel reference signal. Then, the demodulated data signal from which the interference was removed is output through a first output terminal 2.

In demodulation of the horizontal polarization, the second demodulator 18a demodulates the horizontal polarization IF signal 102a. The vertical polarization IF signal 102 is input into the second endless phase shifter 20a after having been frequency-converted in the first multiplier 22 of the second demodulator 18a, and then, a phase of the vertical polarization IF signal 102 is rotated so as to cancel the phase difference having been detected in the local phase difference detector 19. The cross polarization interference is canceled, using an output signal transmitted from the second endless phase shifter 20a, as a cross polarization interference cancel reference signal. Then, the demodulated data signal from which the interference was removed is output through a second output terminal 2a.

Figure 4:
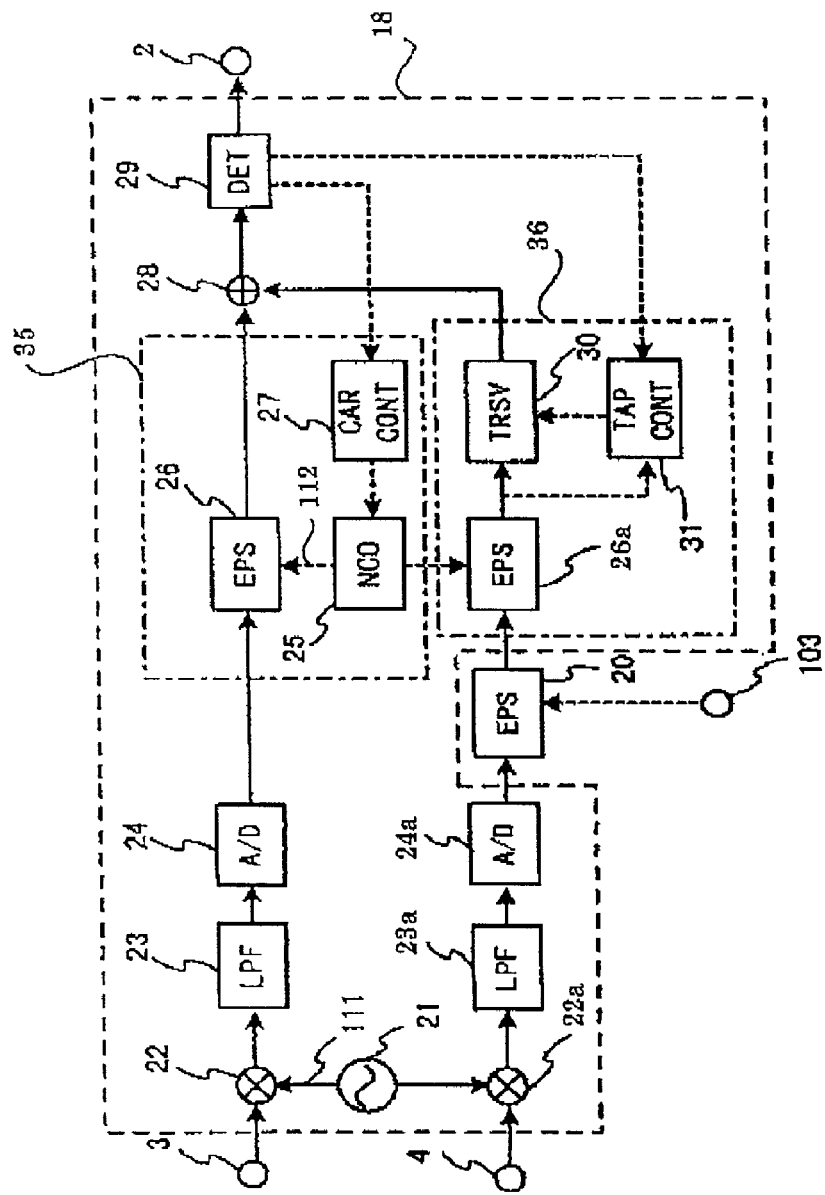
FIG. 4 is a block diagram of the demodulator which is a part of the demodulation system illustrated in FIG. 3.

FIG. 4 is a block diagram of the first demodulator 18. Since the second demodulator 18a has the same structure as the structure of the first demodulator 18, only the structure of the first demodulator 18 is explained hereinbelow with reference to FIG. 4.

As illustrated in FIG. 4, the demodulator 35 is comprised of a numerical controlled oscillator (NCO) 25, a first endless phase shifter (EPS) 26, and a carrier synchronization controller 27, and the cross polarization interference canceller 36 is comprised of a second endless phase shifter (EPS) 26a, a transversal filter 30, and a tap coefficient control circuit 31.

An IF signal associated with the self-polarization and input through a first terminal 3 is frequency-converted in the first multiplier 22 by virtue of a primary carrier signal 111 transmitted from the primary carrier oscillator 21. Then, high frequency parts are removed from the IF signal in the first low-pass filter 23, and thereafter, converted into a digital signal by being quantized in the first analog-digital converter 24.

The digital signal and a secondary carrier signal 112 transmitted from the numerical controlled oscillator 25 are both input into the first endless phase shifter 26 for frequency conversion to thereby demodulate a base band signal.

The carrier synchronization controller 27 produces a phase control signal, based on an error signal transmitted from the judgment circuit 29, and controls a frequency of the secondary carrier signal 112 transmitted from the numerical controlled oscillator 25.

An IF signal associated with the other-polarization and input through a second terminal 4 is frequency-converted in the second multiplier 22a by virtue of the primary carrier signal 111 transmitted from the primary carrier oscillator 21. Then, high frequency parts are removed from the IF signal in the second low-pass filter 23a, and thereafter, converted into a digital signal by being quantized in the second analog-digital converter 24a.

The digital signal is input into the first endless phase shifter 20 which applies phase rotation to the digital signal in accordance with the control signal 103. In the first endless phase shifter 20, a difference between phase noises generated in the first and second local oscillators 16 and 16a independently of each other is removed from the digital signal. The digital signal and the secondary carrier signal 112 transmitted from the numerical controlled oscillator 25 are both input into the first endless phase shifter 26 for frequency conversion to thereby be changed to a cross polarization interference cancel (XPIC) reference signal.

The cross polarization interference cancel (XPIC) reference signal, and a tap coefficient produced in the tap coefficient control circuit 31 for cancellation of the cross polarization interference are both input into the transversal filter 30, in which there is produced a copy signal which reflects the interference caused by the other-polarization in a space. The copy signal is removed from the self-polarization base band signal in the adder 28. Thus, the cross polarization interference is removed.

Figure 5:
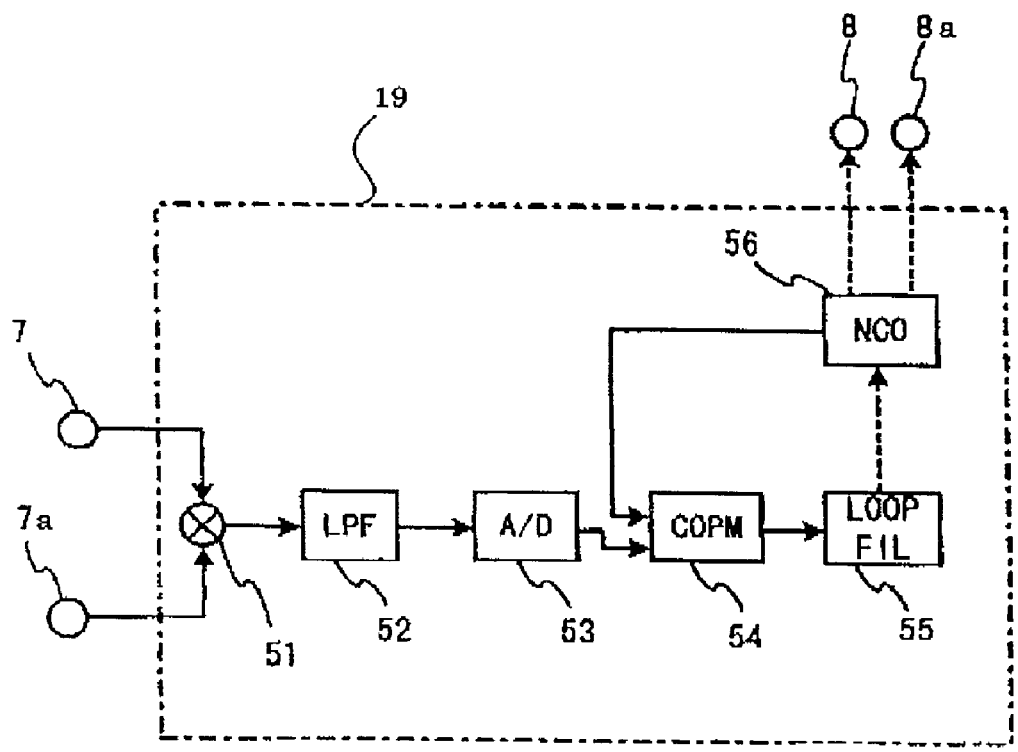
FIG. 5 is a block diagram of the local phase difference detector which is a part of the demodulation system illustrated in FIG. 3.

FIG. 5 is a block diagram of the local phase difference detector 19.

As illustrated in FIG. 5, the local phase difference detector 19 is comprised of a multiplier 51, a low-pass filter 52, an analog-digital converter 53, a phase comparator 54, a loop filter 65, and a numerical controlled oscillator 56.

With reference to FIG. 5, the local signals associated with the vertical and horizontal polarizations are input into the multiplier 51 through first and second input terminals 7 and 7a. An output signal transmitted from the multiplier 51 is input into the low-pass filter 52 for removing high-frequency parts from the output signal. Thus, there is obtained a difference in frequencies.

The output signal transmitted from the low-pass filter 52 is converted into a digital signal in the analog-digital converter 53. The digital signal transmitted from the analog-digital converter 53 and a local phase difference signal transmitted from the numerical controlled oscillator 56 are input into the phase comparator 54. Those signals are compared in the phase comparator 54 with respect to a phase. An output signal transmitted from the phase comparator 54 is input into the numerical controlled oscillator 56 through the loop filter 55 for controlling an oscillation frequency of the numerical controlled oscillator 56.

As a result, the local phase difference signal transmitted from the numerical controlled oscillator 56 to the phase comparator 54 is synchronized with a difference in phase between the local signals of the vertical and horizontal polarizations. The numerical controlled oscillator 56 transmits the control signal 103 to the first endless phase shifter 20 through a first output terminal 8 in accordance with an oscillation frequency of the local phase difference signal transmitted from the numerical controlled oscillator 56. The numerical controlled oscillator 56 further transmits the control signal 103a to the second endless phase shifter 20a through a second output terminal 8a. The control signal 103a has a phase rotating in a direction opposite to a direction in which a phase of the control signal 103 rotates.

Hereinbelow is explained an operation of the cross polarization interference canceller 36 in the first embodiment.

In the explanation, signals are defined as follows.

(a) A base band signal V(t) of the vertical polarization is defined as follows.

$$V(t)=V_P(t)+jV_Q(t)$$

$V_P(t)$ indicates P-channel parts, and $V_Q(t)$ indicates Q-channel parts.

(b) A base band signal H(t) of the horizontal polarization is defined as follows.

$$H(t)=H_P(t)+jH_Q(t)$$

$H_P(t)$ indicates P-channel parts, and $H_Q(t)$ indicates Q-channel parts.

(c) A carrier signal of the vertical polarization is defined as $\cos(\omega_{VT} \times t + \theta_{VT})$ wherein "$\omega_{VT}$" indicates a frequency of a carrier signal of the vertical polarization and "$\theta_{VT}$" indicates a phase of a carrier signal of the vertical polarization.

(d) A carrier signal of the horizontal polarization is defined as $\cos(\omega_{HT} \times t + \theta_{HT})$ wherein "$\omega_{HT}$" indicates a frequency of a carrier signal of the horizontal polarization and "$\theta_{HT}$" indicates a phase of a carrier signal of the horizontal polarization.

Under these definitions, RF signals $V_{TX}(t)$ and $H_{TX}(t)$ of the vertical and horizontal polarizations can be expressed as follows.

$$V_{TX}(t)=V_P(t)\times\cos(\omega_{VT}\times t+\theta_{VT})-V_Q(t)\times\sin(\omega_{VT}\times t+\theta_{VT})$$
$$=\text{real}[V(t)\times\exp(j(\omega_{VT}\times t+\theta_{VT}))]$$

$$H_{TX}(t)=\text{real}[H(t)\times\exp(j(\omega_{HT}\times t+\theta_{HT}))]$$

If it is assumed that the RF signal of the horizontal polarization is merged with the RF signal of the vertical polarization through a coefficient $\alpha V$, and the RF signal of the vertical polarization is merged with the RF signal of the horizontal polarization through a coefficient $\alpha H$, the RF signals $V_{RX}(t)$ and $H_{RX}(t)$ of the vertical and horizontal polarizations can be expressed as follows.

$$V_{RX}(t)=\text{real}[V(t)\times\exp(j(\omega_{VT}\times t+\theta_{VT}))]+\alpha V\times H(t)\times\exp(j(\omega_{HT}\times t+\theta_{HT}))]$$

$$H_{RX}(t)=\text{real}[H(t)\times\exp(j(\omega_{HT}\times t+\theta_{HT}))]+\alpha H\times V(t)\times\exp(j(\omega_{VT}\times t+\theta_{VT}))]$$

Each of the above-mentioned RF signals is frequency-converted in the first and second receivers 15 and 15a in accordance with the following local signals (a) and (b):

(a) Local signal of the vertical polarization: $\cos(\omega_R \times t + \theta_{VR})$ wherein "$\omega_R$" indicates a frequency of the received local signal, and "$\theta_{VR}$" indicates a phase of the received local signal of the vertical polarization; and (b) Local signal of the horizontal polarization: $\cos(\omega_R \times t + \theta_{HR})$ wherein "$\theta_{HR}$" indicates a phase of the received local signal of the horizontal polarization.

Since the local signals are both synchronized commonly with the reference signal, the local signals have the same frequency as each other, and a phase independent of each other.

Herein, it is assumed that the vertical polarization defines self-polarization, which is developed hereinbelow. A received IF signal $V_{IF}(t)$ having passed through a receiver of the self-polarization and a cross polarization interference cancel reference IF signal $V_{IX}(t)$ having passed a receiver of the other-polarized can be expressed as follows.

$$V_{IF}(t)==\text{real}[V(t)\times\exp(j((\omega_{VT}-\omega_R)\times t+(\theta_{VT}-\theta_{VR})))]+\alpha V\times H(t)\times\exp(j((\omega_{HT}-\omega_R)\times t+(\theta_{HT}-\theta_{VR})))]$$

$$V_{IX}(t)==\text{real}[H(t)\times\exp(j((\omega_{HT}-\omega_R)\times t+(\theta_{HT}-\theta_{HR})))]+\alpha H\times V(t)\times\exp(j((\omega_{VT}-\omega_R)\times t+(\theta_{VT}-\theta_{HR})))]$$

Since the first demodulator 18 matches an oscillation frequency of its internal oscillator to a frequency and a phase of the received IF signal, a frequency of the received IF signal is equal to an oscillation frequency of the first demodulator 18, as follows.

$$(\omega_{VT}-\omega_R)=(\omega_{D1}+\omega_{D2})$$

$$(\theta_{VT}-\theta_{VR})=(\theta_{D1}+\theta_{D2})$$

In these equations, "$\omega_{D1}$" indicates a frequency of the received primary carrier signal, "$\omega_{D2}$" indicates a frequency of the received secondary carrier signal, "$\theta_{D1}$" indicates a phase of the received primary carrier signal, and "$\theta_{D2}$" indicates a phase of the received secondary carrier signal.

A received base band signal $V_{BB}(t)$ resulting from demodulation of the received IF signal is expressed as follows.

$$V_{BB}(t)=\text{real}[V(t)\times\exp(j((\omega_{VT}-\omega_R-\omega_{D1}-\omega_{D2})\times t+(\theta_{VT}-\theta_{VR}-\theta_{D1}-\theta_{D2})))+\alpha V\times H(t)\times\exp(j((\omega_{HT}-\omega_R-\omega_{D1}-\omega_{D2})\times t+(\theta_{HT}-\theta_{VR}-\theta_{D1}-\theta_{D2})))]$$

$$=V(t)+\text{real}[\alpha V\times H(t)\times\exp(j((\omega_{HT}-\omega_{VT})\times t+(\theta_{HT}-\theta_{VT})))]$$

The local phase difference detector 19 generates a local phase difference signal in a phase locked loop circuit (not illustrated) equipped therein. The local phase difference signal is expressed as $\exp(j(\theta_{HR}-\theta_{VR}))$.

The first endless phase shifter 20 cancels a phase difference, based on the local phase difference signal. As a result, the base band cross polarization interference cancel (XPIC) reference signal $V_{BX}(t)$ is expressed as follows.

$$V_{BX}(t)=\text{real}[H(t)\times\exp(j((\omega_{HT}-\omega_R-\omega_{D1}-\omega_{D2})\times t+(\theta_{HT}-\theta_{HR}-\theta_{D1}-\theta_{D2})))+\alpha H\times V(t)\times\exp(j((\omega_{VT}-\omega_R-\omega_{D1}-\omega_{D2})\times t+(\theta_{VT}-\theta_{HR}-\theta_{D1}-\theta_{D2})))]\times\exp(j(\theta_{HR}-\theta_{VR}))$$

$$=\text{real}[H(t)\times\exp(j((\omega_{HT}-\omega_{VT})\times t+(\theta_{HT}-\theta_{VT})))+\alpha H\times V(t)]$$

If the cross polarization interference canceller 36 ideally operates, based on the base band cross polarization interference cancel (XPIC) reference signal, the copy signal $V_{XPIC}(t)$ produced by the cross polarization interference canceller 36 and a response signal made by the cross polarization interference canceller 36 are expressed as follows, $$V_{XPIC}(t)=\text{real}[-\alpha V\times H(t)\times\exp(j((\omega_{HT}-\omega_{VT})\times t+(\theta_{HT}-\theta_{VT})))]-\alpha V\times\alpha H\times V(t)$$

The response signal=$-\alpha V$.

Comparing the response signal ($-\alpha V$) in the first embodiment to the response signal ($-\alpha V\times\exp(j(\theta_{HR}-\theta_{VR}))$) in the conventional system, it is understood that the local phase difference $\exp(j(\theta_{HR}-\theta_{VR}))$ which is included in the conventional response signal and has time fluctuation is removed in the response signal in the first embodiment.

Since the cross polarization interference canceller 36 is generally designed to include a two-dimensional transversal filter, addition of a phase component to the cross polarization interference canceller 36 does not exert a harmful influence on the cross polarization interference canceller 36. However, when a phase component fluctuates with the lapse of time, a tap coefficient of the transversal filter has to be adjusted in accordance with the fluctuation of the phase component. Since a tap coefficient becomes greater as the cross polarization interference increases, the adjustment of a phase would be more difficult to accomplish.

Consequently, the ability of canceling the cross polarization interference was degraded as phase noises increased in the conventional cross polarization interference canceller. In contrast, the time fluctuation in a phase component is cancelled by the first and second endless phase shifters 20 and 20a in the cross polarization interference canceller 36 in accordance with the first embodiment. Accordingly, it would be possible to properly determine a time constant of the response signal transmitted from the cross polarization interference canceller 36, in accordance with the time fluctuation in the cross polarization interference.

Figure 6:
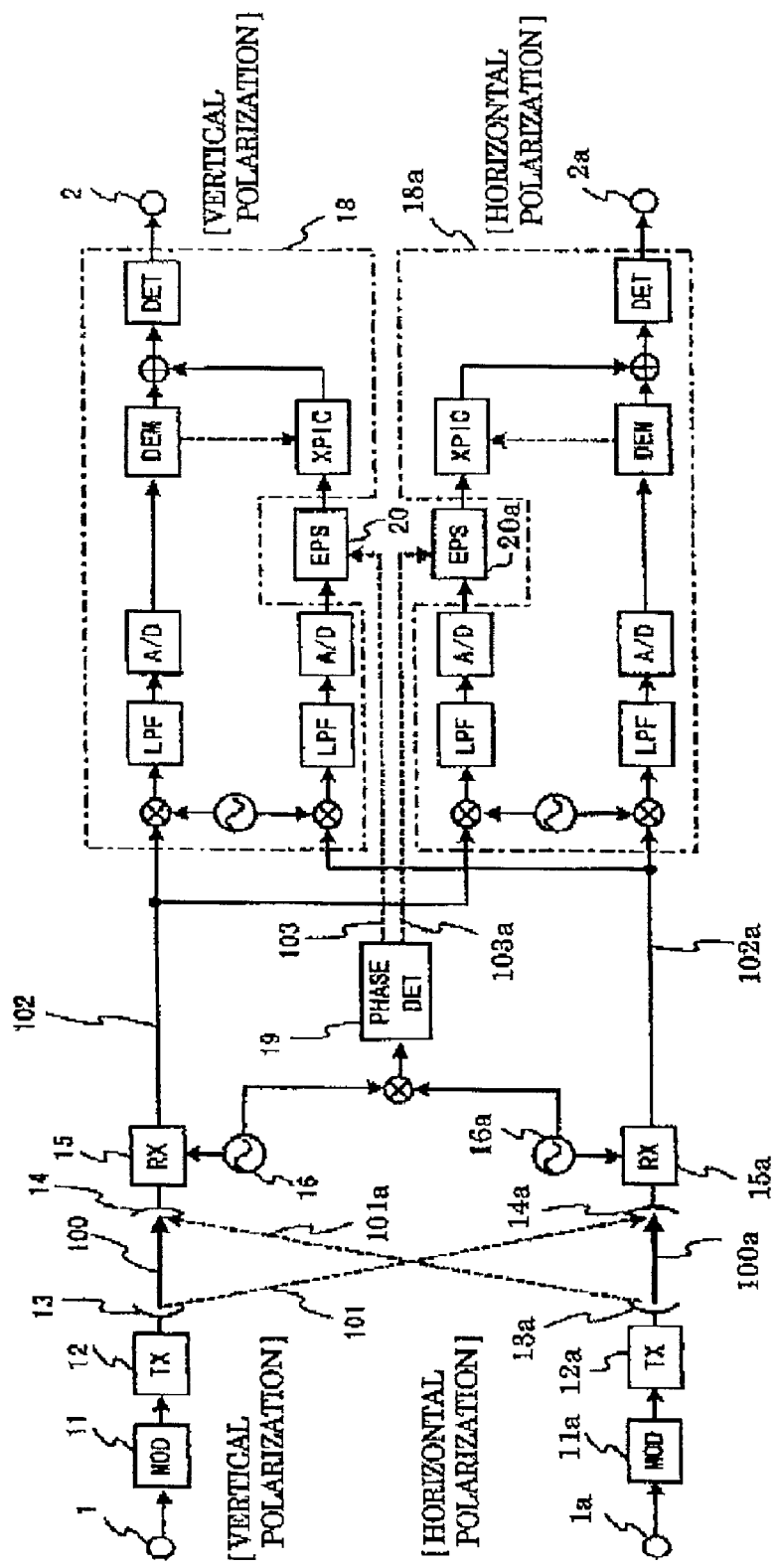
FIG. 6 is a block diagram of the demodulation system in accordance with the second embodiment of the present invention.

FIG. 6 is a block diagram of the demodulation system in accordance with the second embodiment.

In comparison of the demodulation system in accordance with the second embodiment with the demodulation system in accordance with the first embodiment, the demodulation system in accordance with the second embodiment has the same structure as the structure of the demodulation system in accordance with the first embodiment except that the demodulation system in accordance with the second embodiment is designed not to include the common reference oscillator 17.

The first and second endless phase shifters 20 and 20a in the second embodiment is required to cover not only phase noises, but also a phase difference between the local signals. However, since the first and second local oscillators 16 and 16a associated with the vertical and horizontal polarizations transmit the local signals independently of each other, it would be possible to simplify a structure of the first and second local oscillators 16 and 16a.

By enhancing independency of the vertical and horizontal polarizations, one of the polarizations could be readily dealt with.

The demodulation system in accordance with the second embodiment operates in the same way as the demodulation system in accordance with the first embodiment. A difference in operation between the first and second embodiments is that the first and second endless phase shifters 20 and 20a follow not only a phase difference, but also a frequency difference.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-350876 filed on Nov. 17, 2000 including specification, claims, drawings and summary is incorporated herein by reference in its entirety.

What is claimed is:

1. A cross polarization interference canceller comprising:
   (a) first and second signal receivers which receive signals having been transmitted through first and second polarizations which are orthogonal;
   (b) first and second local oscillators each of which converts one of said signals into an IF signal;
   (c) first and second demodulators each of which demodulates said IF signal for producing a base-band signal and a cross polarization interference cancel reference signal;
   (d) a phase-difference detector which detects a phase-difference between local signals transmitted from said first and second local oscillators, and transmits a phase-difference signal indicative of the thus detected phase-difference; and
   (e) first and second phase controllers associated with said first and second demodulators, respectively, and each equalizing phases of said base-band signal and said cross polarization interference cancel reference signal to each other in accordance with said phase-difference signal;
   wherein said phase-difference detector includes:
   (d1) a multiplier which multiplies signals transmitted from said first and second local oscillators, by each other to thereby transmit a frequency-difference signal;
   (d2) an analog-digital converter which converts said frequency-difference signal to a digital signal;
   (d3) a numerical controlled oscillator which transmits a local phase-difference signal;

(d4) a phase comparator compares said local phase-difference signal and said frequency-difference signal to each other, and transmits a difference signal indicative of a difference between said local phase-difference signal and said frequency-difference signal; and (d5) a filter which controls a frequency of said local phase-difference signal in accordance with said difference signal.

2. A cross polarization interference canceller comprising:

(a) first and second signal receivers which receive signals having been transmitted through first and second polarizations which are orthogonal;

(b) first and second local oscillators each of which converts one of said signals into an IF signal;

(c) first and second demodulators each of which demodulates said IF signal for producing a base-band signal and a cross polarization interference cancel reference signal;

(d) a phase-difference detector which detects a phase-difference between local signals transmitted from said first and second local oscillators, and transmits a phase-difference signal indicative of the thus detected phase-difference;

(e) first and second phase controllers associated with said first and second demodulators, respectively, and each equalizing phases of said base-band signal and said cross polarization interference cancel reference signal to each other in accordance with said phase-difference signal; and (f) a reference oscillator electrically connected to both said first and second local oscillators for synchronizing said first and second local oscillators with each other;

wherein said phase-difference detector includes:

(d1) a multiplier which multiplies signals transmitted from said first and second local oscillators, by each other to thereby transmit a frequency-difference signal;

(d2) an analog-digital converter which converts said frequency-difference signal to a digital signal;

(d3) a numerical controlled oscillator which transmits a local phase-difference signal;

(d4) a phase comparator compares said local phase-difference signal and said frequency-difference signal to each other, and transmits a difference signal indicative of a difference between said local phase-difference signal and said frequency-difference signal; and (d5) a filter which controls a frequency of said local phase-difference signal in accordance with said difference signal.

* * * * *